Figure 1:
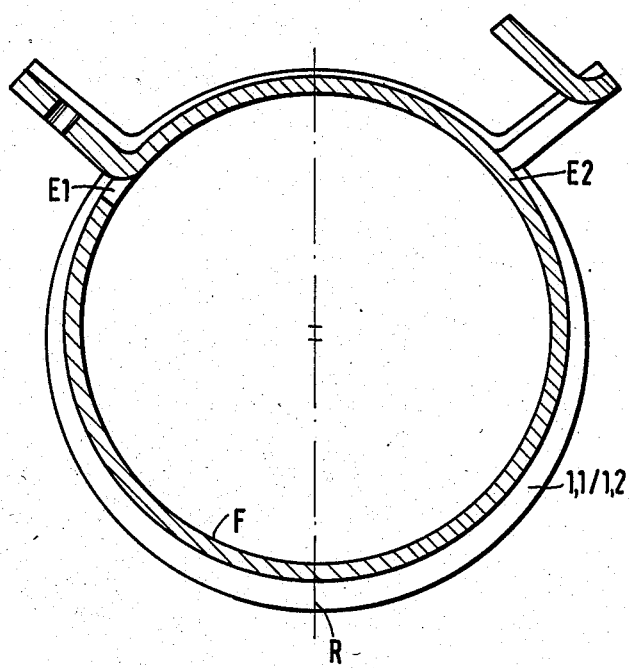

United States Patent [19]

Horcher born Klöss

[11] Patent Number: 4,583,268
[45] Date of Patent: Apr. 22, 1986

[54] TUBE CLAMP

[75] Inventor: Heide Horcher born Klöss, Schöneck, Fed. Rep. of Germany

[73] Assignee: Willi Horcher, Schöneck, Fed. Rep. of Germany

[21] Appl. No.: 762,025
[22] PCT Filed: Mar. 22, 1983
[86] PCT No.: PCT/EP83/00081
  § 371 Date: Nov. 16, 1983
  § 102(e) Date: Nov. 16, 1983
[87] PCT Pub. No.: WO83/03456
  PCT Pub. Date: Oct. 13, 1983

Related U.S. Application Data

[63] Continuation of Ser. No. 557,175, Nov. 16, 1983, abandoned.

[30] Foreign Application Priority Data

Mar. 22, 1982 [DE] Fed. Rep. of Germany ....... 3210437

[51] Int. Cl.⁴ ............................................. B65D 63/02
[52] U.S. Cl. ............................... 24/20 R; 24/20 CW; 24/23 R; 24/23 W; 285/178; 285/243; 403/351; 403/DIG. 7
[58] Field of Search ............ 24/20 R, 20 CW, 20 EE, 24/23 R, 23 EE, 22, 19, 268, 269, 20 S, 20 W, 23 W; 285/243, 178; 403/DIG. 7, 351

[56] References Cited

U.S. PATENT DOCUMENTS

| | | | |
|---|---|---|---|
| 583,454 | 6/1897 | Burns ..................................... | 24/22 |
| 767,893 | 8/1904 | Jewell .................................. | 285/243 |
| 1,378,508 | 5/1921 | Woodward ......................... | 24/19 |
| 2,285,850 | 6/1942 | Weeks . | |
| 3,087,221 | 4/1963 | Armstrong ...................... | 24/20 CW |
| 3,334,388 | 8/1967 | Turbyfill ............................ | 24/279 |
| 3,482,857 | 12/1969 | Gohs ................................. | 285/178 |
| 4,305,179 | 12/1981 | Sakurada ......................... | 24/23 R |
| 4,312,101 | 1/1982 | Oetiker ............................. | 24/20 CW |

FOREIGN PATENT DOCUMENTS

| | | | |
|---|---|---|---|
| 1425424 | 11/1968 | Fed. Rep. of Germany . | |
| 1558575 | 2/1969 | France ............................. | 285/243 |
| 685982 | 1/1953 | United Kingdom ......... | 403/DIG. 7 |
| 1560606 | 2/1980 | United Kingdom . | |

*Primary Examiner*—Victor N. Sakran
*Attorney, Agent, or Firm*—Cushman, Darby & Cushman

[57] ABSTRACT

In order to guarantee the sealing quality of a joining between a pipe socket and a tube by means of a clamp pressing a tube on a pipe wall, where the press-on power to be exercised by the tube clamp will act as uniformly as possible all over the total pipe circumference and cause no damage to the tube, it is suggested that the clamp is an open tube clamp being operative by its inner clamping power over a relatively wide-ranged press-on surface, being moved into its acting position by a tool overcoming the clamping power, and where an almost uniform pressing is provided extending over the total press-on surface (F) by a cross section increasing from the open ends (E1, E2) in direction to the clamping dead center (R). Thereby the change of the cross section of the part exercising the pressing-on is essentially accomplished by at least one open clamping ring tapering from the clamping dead center (R) in direction to both sides according to the required measure of forces, where the clamping ring is designed in such a manner that in its dimensions it is outwards exceeding the part defining the mere press-on surface (F).

1 Claim, 2 Drawing Figures

TUBE CLAMP

This is a continuation of application Ser. No. 557,175 filed Nov. 16, 1983 which was abandoned upon the filing thereof.

The invention relates to an open tube clamp operative by its inner chucking power over a relatively wide-ranged pressing surface, which is being moved into acting position by means of a tool overcoming the chucking power, and where an almost uniform pressing against the total pressing surface is provided by a cross section increasing in the direction from the open ends to the dead center of the clamping.

Generally one uses tube clamps for the staunch joining of a pipe socket with a flexible tube. In order to be able to quickly mount and also detach such a tube clamp, it is expedient to use an open construction type operating with inner elastic power. For mounting such a structure on its place of operation, one needs a tool that elastically bends apart this clamp.

Easy to manufacture are tube clamps being composed of an open wire spring ring configured like a spiral having somewhat more than one thread. Thereby the open wire ends are squared off in such a manner that a tool surmounting the inner clamping power can be easily applied thereto.

These fixing clamps being sufficient for modest demands and which can be regarded as being generally known, however, have the decisive disadvantage that due to their cross section unvarying all over the thread, when being positioned at their place of action and also during serving their purpose of working with inner clamping power, within the area of the clamping-dead center, they will experience a greater stress and thus also fatigue than at their open ends. In this manner, however, the pressure to be excercised by the inner spring power for pressing-on the tube cannot be kept constant to the desired degree all over the full range of clasping; this pressure will automatically decrease from the clamping dead center to the open ends.

In order to overcome this handicap, one has already designed clamps bent from a plate and provided this plate with openings, so that on the one hand there will result a reduced cross section of the molded and hardened sheet metal ring starting from the clamping dead center to the open ends of the ring, and on the other hand in released condition also a sufficient overlapping of the open ring ends can be obtained.

However, the tube clamps designed in that manner show the disadvantage of being relatively ill-suited for mass production, since it is rather difficult to form them and keep up their configuration even after the hardening in such a manner that in press-on condition they will show the uniform rounding being necessay for the dealing; besides the tube clamps of the aforementioned design being offered on the market show relatively sharp edges on both sides of their press-on surface so that hereby a shearing power is exercised on the tube to be pressed on. If the pipe socket and the tube slipped thereon are components of a machine being exposed to vibrations, then the clamp pressing-on the tube should be shaped and able to keep up its shape in such a manner that the press-on pressure stays as constant as possible all over the tube circumference defining the sealing district for a long time of operation and that likewise no incidental forces can arise leading to destruction.

It is the object of the present invention to develop a tube clamp of the kind as mentioned at the outset in such a manner as to provide a clamp easily to be manufactured and meeting high demands, which guarantees that, among others, the necessary press-on pressure, also after a long time of operation, is still available even if used in arrangements showing vibrations, and that a notching or cutting in of a tube, which very often lead to leakages, is impossible.

According to the invention this object is realized essentially by the characteristics listed in patent claim 1. Hereafter a press-on surface enclosing the tube is receiving its uniform press-on quality by the power effect of at least one clamping ring of which the outer dimensions exceed the mere surface material.

According to the characteristics indicated in the subclaims, this clamping ring can be obtained either directly by an expedient molding of the material blank to a press-on surface and clamping ring or, respectively, clamping rings, or can be spring-mounted on the press-on surface as a separate individual member. In the latter case this member can be a screw-bolt joint of the kind as described in the patent specification DRP No. 540,229, with eyes on the outside to surmount the inner clamping power.

Figure 2:
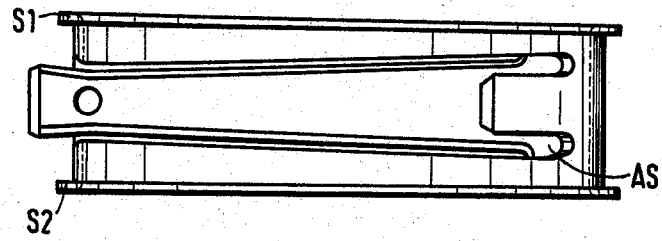

Further details, advantages, and characteristics of the invention will follow from the embodiment example as shown in the drawing, where FIG. 1 is a tube clamp in side view, and FIG. 2 a tube clamp in top view.

The drawing shows a clamp formed of a relatively thin plate, where the clamp material on both sides (1.1/1.2) of the portion defining the press-on surface (f) is curved in such a manner that vertically thereto two clamping rings (S1/S2) are formed. These clamping rings S1, S2, provide the tension means of the present invention.

The cut of the material and the bendings are made in such a manner that in each clamping ring, starting from the clamping dead center (R) and up to the farthest points (E1/E2), the stilting is decreasing according to the required reduction of clamping power. The drawing clearly shows that the stilting at the clamping dead center (R) is higher than at the ends of the clamps.

The one end (E1) of the so formed open spring ring of plane appearance is led through an opening (AS) of the other end (E2). Both ends are bent outwards for placing a tool in such a manner that at the same time a stop pin (generally known in the art) is formed for the maximal permissible travel of the springing. For a clamp material one can use hardenable spring band material. Fields of application are e.g. cooling systems of heat motors as they are used in the motor car manufacture.

I claim:

1. A hose clamp having overlapping end portions from which holding members project in a generally radial direction, said clamp including a relatively wide pressure surface and being made from an elastic material to provide for a substantially uniform pressure over the entire said pressure surface, said pressure surface having, integral therewith, tension means, said tension means comprising a pair of rings of said material each bent from said pressure surface to extend substantially radially with the transition from said pressure surface to each ring being rounded and smooth, each said ring having a radial dimension that varies from a maximum at a selected point to a selected minimum which is adjacent said holding members, said maximum being diametrically opposite to said minimum with said range being gradually reduced in their radial extent between said maximum and said minimum whereby the cross section of said clamp is varied from a maximum to a minimum.

* * * * *